No. 698,995. Patented Apr. 29, 1902.
E. M. McCLEARY.
DAMPER.
(Application filed July 13, 1901.)
(No Model.)
Fig. 1.
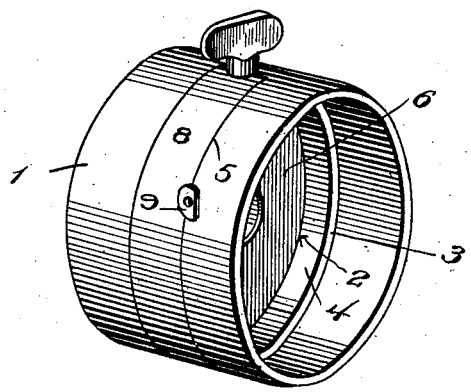
Fig. 2. Fig. 3.
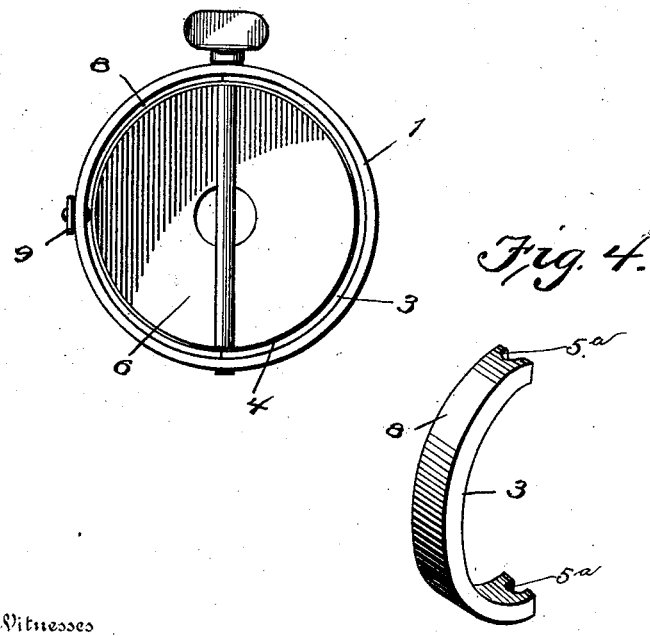
Fig. 4.
Witnesses
Geo. Ackman
H. Schmidt
Inventor
E. M. McCleary
By Victor J. Evans
Attorney
THE NORRIS PETERS CO., PHOTO-LITHO., WASHINGTON, D. C.

UNITED STATES PATENT OFFICE.

EDGAR MILTON McCLEARY, OF BOONEVILLE, IOWA.

DAMPER.

SPECIFICATION forming part of Letters Patent No. 698,995, dated April 29, 1902.

Application filed July 13, 1901. Serial No. 68,226. (No model.)

*To all whom it may concern:*

Be it known that I, EDGAR MILTON MC-CLEARY, a citizen of the United States, residing at Booneville, in the county of Dallas and State of Iowa, have invented new and useful Improvements in Dampers, of which the following is a specification.

This invention relates to stovepipe-dampers; and the primary object thereof is to provide a detachable damper which may be readily interposed between the pipe-sections without detracting from the appearance thereof.

With this object in view the invention consists, primarily, in providing a ring into which one end each of two pipe-sections is adapted to fit, said ring detachably carrying the damper; and the invention further consists in providing a segmental strip adapted to fit in a corresponding slot in said ring, whereby the damper may be secured in or released from the ring.

In the drawings, Figure 1 is a perspective view of the device ready to be applied. Fig. 2 is an end elevation of the same. Fig. 3 is a side elevation of the damper-pintle. Fig. 4 is a detail perspective view of the damper-securing strip.

Referring to the drawings by numerals of reference, 1 designates a ring of such size as to conform to the standard diameter of pipe and provided with shoulders 2 and 3, formed by a concentric bead 4, cast integral with the ring and positioned intermediate the edges thereof, which alone constitute the stovepipe-joint. A semicircular slot 5 is formed in the ring, the ends of said slot and the semicircular openings 5ª in the ends of the segmental strip 8 forming bearings for the pintle of the damper, which may be operated by a handle. 8 designates a segmental securing-strip, approximately semicircular and adapted to fit in and close the slot 5, thereby locking the damper 6 in place. In order to prevent accidental displacement of said strip, I provide an eccentric turn-button 9, mounted on the ring 1 adjacent the slot 5, so that it can be turned to project over the strip 8, thereby preventing outward movement thereof.

In assembling the parts it will only be necessary to interpose the ring between the meeting ends of the pipe-sections, and as the ends will abut against the shoulders 2 and 3 of said ring a tight joint will be made and the inner walls will be unbroken, so as to permit the damper to be readily turned without meeting with any obstruction. Should the disk of the damper become burned out or need attention, it will be only necessary to release the securing-strip 8, when the damper may be readily removed. As soon as a new damper is inserted or the old one mended it may be readily inserted in place, and by inserting the strip 8 it will be securely fastened without the necessity of taking down the pipe or disturbing the same.

From the foregoing it will readily be seen that I have provided a cheap, durable, and efficient damper, holder, and joint which will readily perform the services for which it is intended.

Having thus fully described my invention, what I claim as new, and desire to secure by Letters Patent, is—

1. In a stovepipe-damper, a ring provided with an inwardly-projecting bead and a slot in line with said bead in the ring, in combination with a strip adapted to fill said slot and project within the inner periphery of the ring, the inner edges of the strip and the said bead forming shoulders for the meeting edges of two pipe-sections, and bearings formed in the said ring and strip for a damper.

2. In a stovepipe-damper, a ring provided with an inwardly-projecting bead extending substantially half-way around the ring and a slot in line with said bead in the other half of the ring, in combination with a substantially semicircular strip adapted to fill said slot and project within the inner periphery of the ring to form the complement of the said bead, the ring and strip being so constructed as to form bearings for a damper.

In testimony whereof I affix my signature in presence of two witnesses.

EDGAR MILTON McCLEARY.

Witnesses:
B. F. DAVIS,
CHAS. C. COOK.